(12) United States Patent
Rhoades et al.

(10) Patent No.: US 9,869,389 B2
(45) Date of Patent: Jan. 16, 2018

(54) PARKING LOCK MECHANISM FOR A TRANSMISSION

(71) Applicant: DANA AUTOMOTIVE SYSTEMS GROUP, LLC, Maumee, OH (US)

(72) Inventors: Douglas R. Rhoades; Robert Wright, Haskins, OH (US); Aaron Gries, Perrysburg, OH (US); David Miller, Waterville, OH (US); Adam Hahn, Lambertville, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 254 days.

(21) Appl. No.: 14/392,081

(22) PCT Filed: Mar. 13, 2014

(86) PCT No.: PCT/US2014/025646
§ 371 (c)(1),
(2) Date: Sep. 14, 2015

(87) PCT Pub. No.: WO2014/151395
PCT Pub. Date: Sep. 25, 2014

(65) Prior Publication Data
US 2016/0033037 A1 Feb. 4, 2016

Related U.S. Application Data

(60) Provisional application No. 61/786,916, filed on Mar. 15, 2013.

(51) Int. Cl.
*F16H 63/34* (2006.01)

(52) U.S. Cl.
CPC ..... *F16H 63/3433* (2013.01); *F16H 63/3416* (2013.01); *F16H 63/3466* (2013.01); *B60Y 2400/414* (2013.01)

(58) Field of Classification Search
CPC ............ F16H 63/3433; F16H 63/3416; F16H 63/3466
(Continued)

(56) References Cited

U.S. PATENT DOCUMENTS 4,369,867 A 1/1983 Lemieux
5,696,679 A 12/1997 Marshall et al.
(Continued)

FOREIGN PATENT DOCUMENTS

EP 2 921 747 * 9/2015

OTHER PUBLICATIONS

European Patent Office, International Search Report, dated Jul. 10, 2014, European Patent Office, Rijswijk, Netherlands.

*Primary Examiner* — William C Joyce
(74) *Attorney, Agent, or Firm* — Marshall & Melhorn, LLC

(57) ABSTRACT

A parking lock mechanism having a motor, an actuation shaft, an engagement cam, a release cam, a cam biasing member, a pawl member and a lock gear. The engagement cam has a first side, a second side and a perforation there through. An outer edge of the engagement cam has a contact portion and an engagement portion. The release cam has a first side, a second side and a perforation there through. An outer edge of the release cam has a release member and an engagement portion. The cam biasing member has a first end, a coil portion and a second end. The pawl member has a pivot perforation, an engagement end, a locking protuberance and a sensor protuberance. The pawl member is disposed adjacent the engagement cam and the release cam. The lock gear has a plurality of inner splines and outer teeth.

13 Claims, 3 Drawing Sheets

(58) Field of Classification Search
USPC .......................................................... 74/411.5
See application file for complete search history.

(56) References Cited

U.S. PATENT DOCUMENTS

| | | | |
|---|---|---|---|
| 6,725,962 B1 | 4/2004 | Fukuda | |
| 9,657,836 B2 * | 5/2017 | Kristofcsak | ......... F16H 63/3433 |
| 2007/0283735 A1 | 12/2007 | Schweiher et al. | |
| 2009/0193931 A1 * | 8/2009 | Burgardt | ............. F16H 63/3416 |
| | | | 74/577 M |

* cited by examiner

PARKING LOCK MECHANISM FOR A TRANSMISSION

RELATED APPLICATIONS

This application claims the benefit of U.S. Provisional Application No. 61/786,916 filed on Mar. 15, 2013, which is incorporated by reference in its entirety herein.

FIELD OF THE INVENTION

The invention relates to a transmission for vehicles and, more particularly, to a parking lock mechanism for a transmission.

BACKGROUND OF THE INVENTION

Transmissions for vehicles may include a parking lock mechanism. Typically, the parking lock mechanism is included in an automatic transmission. The parking lock mechanism locks an output shaft of the transmission to prevent the vehicle from rolling when the vehicle is not in use. The parking lock mechanism typically includes a lock gear fitted to the output shaft of the transmission. Alternately, the lock gear may be drivingly engaged with the output shaft. When directed by an operator of the vehicle or a control system of the vehicle, a pawl engages the lock gear, which prevents the vehicle from rolling.

Occasionally, when the parking lock mechanism is engaged, the output shaft (and thus the parking lock mechanism) of the vehicle may be subjected to an abnormally large rotational force. As non-limiting examples, the abnormally large rotational force may be applied to the output shaft when an object collides with the vehicle or when the vehicle is parked at an excessive incline. When the abnormally large rotational force is applied to the output shaft, the parking lock mechanism is typically damaged, requiring repair of the parking lock mechanism.

It would be advantageous to develop a parking lock mechanism for a transmission that releases when the output shaft of the transmission is subjected to an abnormally large rotational force.

SUMMARY OF THE INVENTION

A parking lock mechanism having a motor, an actuation shaft, an engagement cam, a release cam, a cam biasing member, a pawl member and a lock gear. The engagement cam has a first side, a second side and a perforation formed there through, wherein an outer edge of the engagement cam has a contact portion and an engagement portion. The engagement portion extends radially outward from the engagement cam. The release cam has a first side, a second side and a perforation formed there through, wherein an outer edge of the release cam has a release member and an engagement portion. The release member is tapered and extends radially outward from the release cam. The release cam engagement portion engages a second end of the cam biasing member. The cam biasing member has a first end, a coil portion and a second end. The pawl member has a pivot perforation, an engagement end, a locking protuberance and a sensor protuberance. The pawl member is disposed adjacent the engagement cam and the release cam. The lock gear has a plurality of inner splines and plurality of outer teeth.

Various objects and advantages of this invention will become apparent to those skilled in the art from the following detailed description of the preferred embodiments, when read in light of the accompanying drawing.

BRIEF DESCRIPTION OF THE DRAWING

The above, as well as other advantages of the present invention, will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
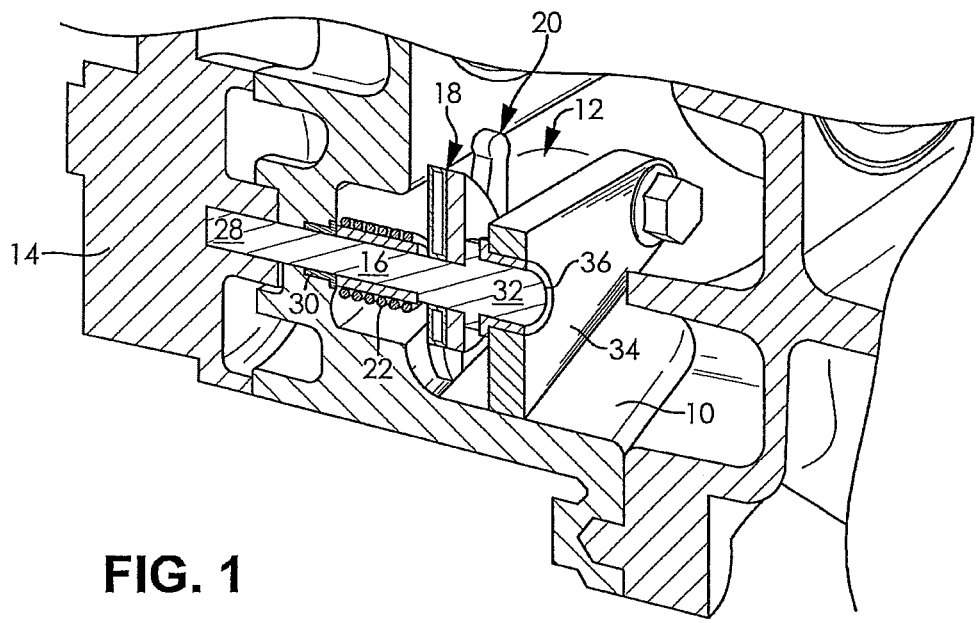
FIG. 1 is a cut-away perspective view of the present invention.
Figure 2:
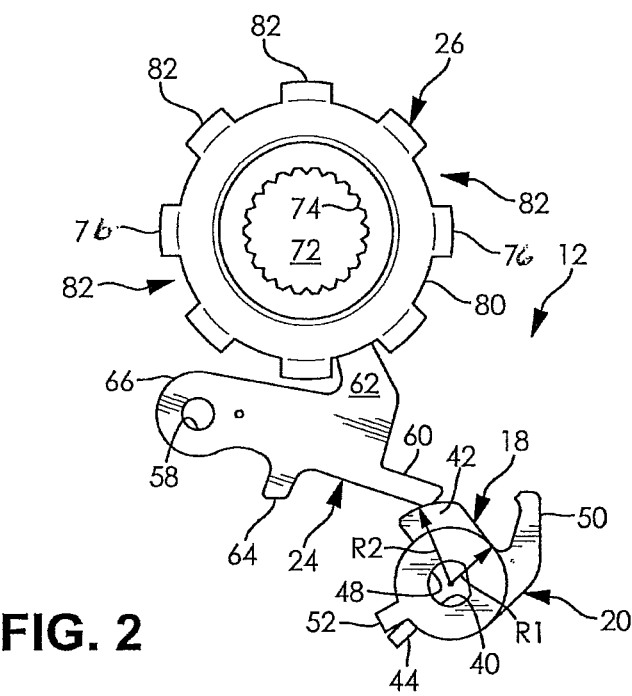
FIG. 2 is a side view of the present invention.

FIG. 1 illustrates a transmission housing 10 including a parking lock mechanism 12 according to an embodiment of the invention. The parking lock mechanism 12 preferably comprises a motor 14, an actuation shaft 16, an engagement cam 18, a release cam 20, a cam biasing member 22, a pawl member 24, and a lock gear 26. The pawl member 24 and lock gear 26 are shown in FIG. 2. As shown, the parking lock mechanism 12 is disposed within the transmission 10; however, it is understood that the parking lock mechanism 12 may be partially disposed in the transmission 10.

The motor 14 applies a rotational force to the actuation shaft 16 and the release cam 20. The motor 14 is a reversible electric motor disposed adjacent the transmission housing 10. However, it is understood that the motor 14 may be any other kind of motor. As non-limiting examples, the motor 14 may be a stepper motor or a pneumatic motor. The motor 14 is drivingly engaged with the actuation shaft 16, which rotates when the motor 14 is activated.

The actuation shaft 16 is a substantially stepped cylindrical elongate member that rotates when the motor 14 is activated. A first end 28 of the actuation shaft 16 is drivingly engaged with the motor 14. The first end 28 of the actuation shaft 16 is rotatably supported within the transmission housing 10 using a bushing 30. A second end 32 of the actuation shaft 16 is rotatably supported within a shaft support member 34 using a bushing 36. Alternately, it is understood that the actuation shaft 16 may be rotatably supported using a ball bearing, a journal bearing, or any other device that rotatably supports the actuation shaft 16. The shaft support member 34 is coupled to the transmission housing 10 with a threaded fastener; however, it is understood that the shaft support member 34 may be coupled to the transmission housing 10 in any conventional manner or the shaft support member 34 may form a portion of the transmission housing 10.

The engagement cam 18 is a member having a substantially uniform thickness rotatably disposed on the actuation shaft 16. The engagement cam 18 has a first side disposed against a step formed in the actuation shaft 16. The engagement cam 18 has a second side disposed against the release cam 20. As shown in FIGS. 1 and 2, the engagement cam 18 has a perforation 40 formed therethrough for receiving the actuation shaft 16. A portion of an outer edge of the engagement cam 18 forms a contact portion 42 and an engagement portion 44.

Figure 3:
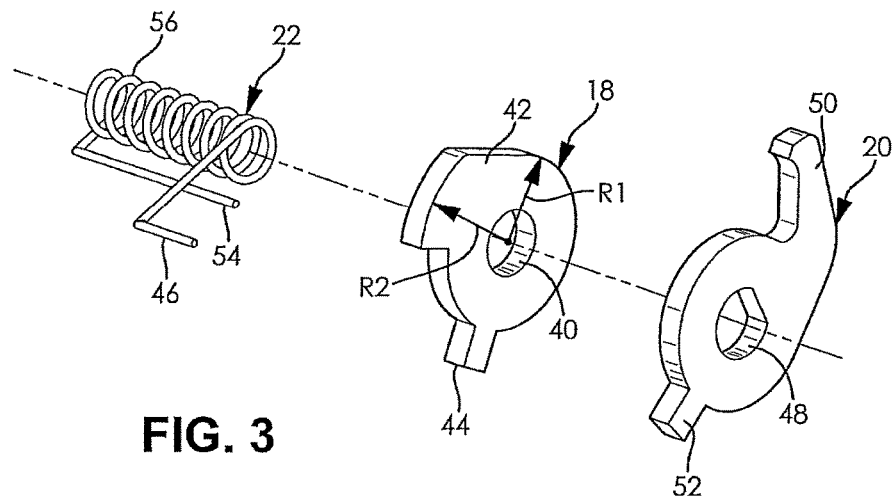
FIG. 3 is a is a perspective view of the present invention.

The contact portion 42 forms a cam and has an increasing radius with respect to the perforation 40. As shown in FIGS. 2 and 3, an initial radius R1 of the contact portion 42 is substantially equal to a radius of a remaining portion of the engagement cam 18. A final radius R2 of the contact portion 42 is greater than a radius of a remaining portion of the engagement cam 18. It is understood that a transition from the initial radius R1 to the final radius R2 of the contact portion 42 may be adapted to determine an engagement characteristic of the parking lock mechanism 12.

The engagement portion 44 of the engagement cam 18 is in driving engagement with a first end 46 of the cam biasing member 22. As shown in FIG. 3, the engagement portion 44 is a substantially rectangular tab extending radially outward from the engagement cam 18; however, it is understood that the engagement portion 44 may be a recess or perforation formed in the engagement cam 18 or have any other shape.

The release cam 20 is a member having a substantially uniform thickness disposed on and drivingly engaged with the actuation shaft 16. The release cam 20 has a first side disposed against a step formed in the actuation shaft 16. The first side of the release cam 20 is also disposed adjacent the second side of the engagement cam 18. The release cam 20 has a second side disposed against the cam biasing member 22. As shown in FIGS. 2 and 3, the release cam 20 has a perforation 48 formed therethrough for receiving the actuation shaft 16. A portion of an outer edge of the release cam 20 forms a release member 50 and an engagement portion 52.

The release member 50 is a portion of the release cam 20 extending radially outward from the release cam 20. When the release cam 20 is rotated, the release member 50 contacts and is drivingly engaged with the pawl member 24, shown in FIG. 2. As shown in FIGS. 2 and 3, the release member 50 is tapered and has a distal end having a circular shape; however, it is understood that the release member 50 may have any other shape.

The engagement portion 52 is a portion of the release cam 20 in driving engagement with a second end 54 of the cam biasing member 22. As shown in FIGS. 2 and 3, the engagement portion 52 is a substantially rectangular tab extending radially outward from the release cam 20; however, it is understood that the engagement portion 52 may be a recess or perforation formed in the release cam 20 or have any other shape.

The cam biasing member 22 is a coil torsion spring disposed about the actuation shaft 16. The cam biasing member 22 includes the first end 46, a coil portion 56, and the second end 54. The first end 46 of the cam biasing member 22 is in driving engagement with the engagement portion 44 of the engagement cam 18. The second end 54 of the cam biasing member 22 is in driving engagement with the engagement portion 52 of the release cam 20.

The first end 46 is a portion of the cam biasing member 22 able to be drivingly engaged with the engagement portion 44 of the engagement cam 18. A shown in FIG. 3, the first end 46 of the cam biasing member 22 is bent into a right angle; however, it is understood that the first end 46 may have other shapes such as an acute angle, an obtuse angle, a hook, a loop, or other shapes.

The coil portion 56 is a helical shaped portion of the cam biasing member 22 connecting the first end 46 and the second end 54. A diameter of the coil portion 56 allows the cam biasing member 22 to be disposed about the actuation shaft 16. When one of the first end 46 and the second end 54 are moved with respect to one another, the coil portion 56 stores energy.

The second end 54 is a portion of the cam biasing member 22 able to be drivingly engaged with the engagement portion 52 of the release cam 20. A shown in FIG. 3, the second end 54 of the cam biasing member 22 is bent into a right angle and extends along the coil portion 56; however, it is understood that the second end 54 may have other shapes such as an acute angle, an obtuse angle, a hook, a loop, or other shapes.

The pawl member 24, as shown in FIG. 2 is an elongate member pivotally coupled to the transmission housing 10. The pawl member 24 comprises a pivot perforation 58, an engagement end 60, a locking protuberance 62, and a sensor protuberance 64. The pawl member 24 may be drivingly engaged with the lock gear 26 by a pawl biasing member 66 which rotates the pawl member 24 about the pivot perforation 58, urging the locking protuberance 62 away from the lock gear 26. The pawl member 24 is disposed adjacent the engagement cam 18 and the release cam 20. The pawl member 24 may be pivoted about the pivot perforation 58 in a plane substantially parallel to a plane each of the engagement cam 18 and the release cam 20 are able to rotate within.

Figure 4:
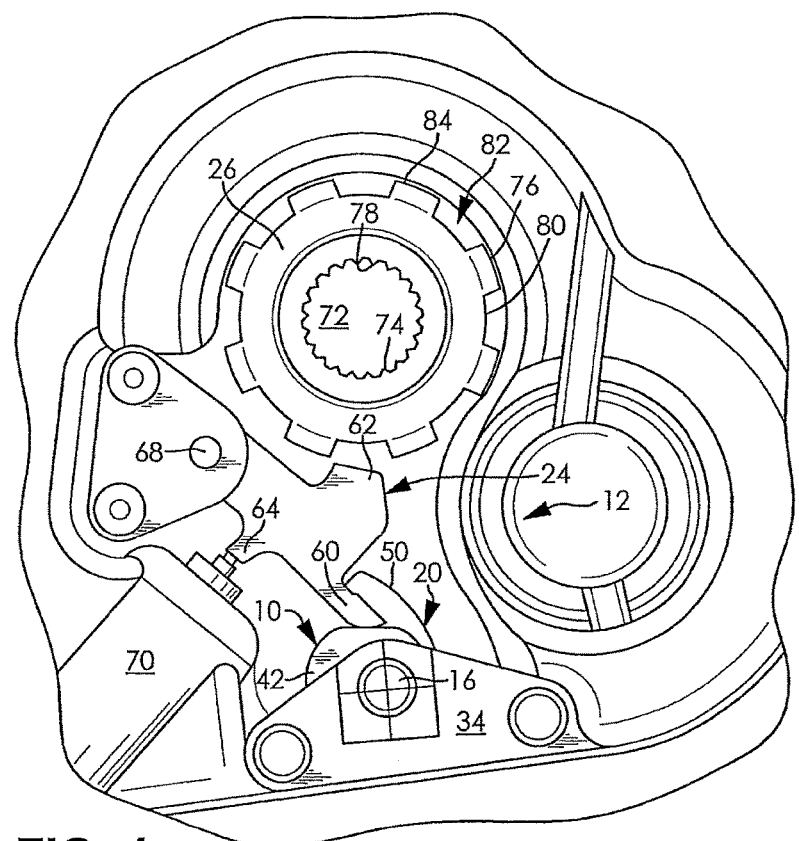
FIG. 4 is a side view of the present invention in drive position in a transmission housing.
Figure 5:
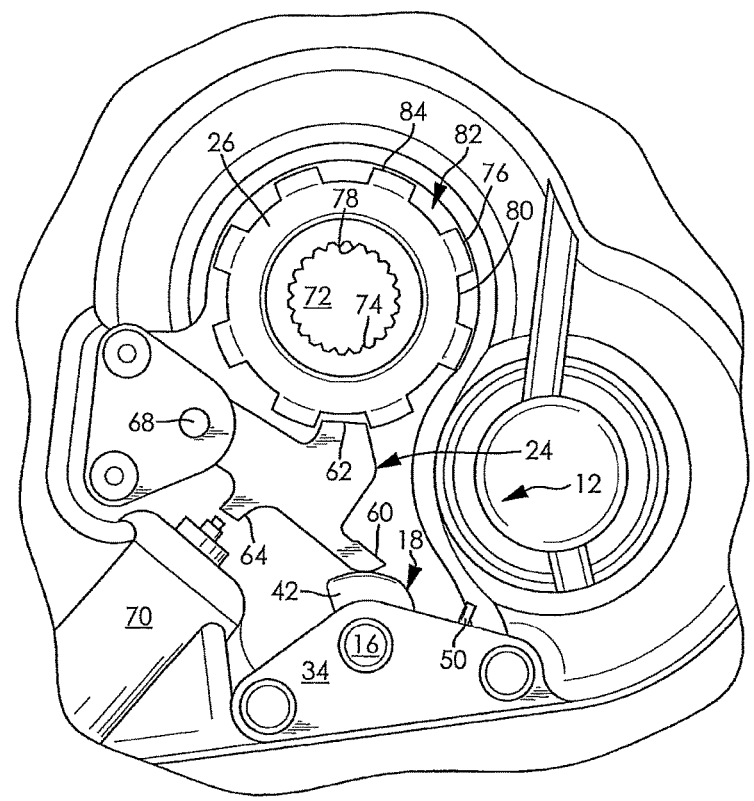
FIG. 5 is another side view of the present invention in park position in a transmission housing.

The pivot perforation 58 is a circular perforation defined by the pawl member 24. A flanged fastener 68 is disposed through the pivot perforation for pivotally coupling the pawl member 24 to the transmission housing 10, as shown in FIGS. 4 and 5.

The engagement end 60 is a portion of the pawl member 24 able to be drivingly engaged with the release member 50 of the release cam 20. As shown in FIGS. 2 and 4, the engagement end 60 is rectangular in shape and extends away from the pivot perforation 58; however, it is understood that the engagement end 60 may have any other shape.

The locking protuberance 62 is a portion of the pawl member 24 able to be drivingly engaged with the lock gear 26. As shown in FIGS. 2, 4 and 5, the locking protuberance 62 is trapezoidal in shape, corresponds to a portion of the lock gear 26 and extends away from a remaining portion of the pawl member 24 in an oblique manner; however, it is understood that the locking protuberance 62 may have any other shape that facilitates driving engagement with the lock gear 26.

The sensor protuberance 64 is a portion of the pawl member 24 used to actuate a sensor 70. The sensor 70 may be actuated when the sensor protuberance 64 contacts or depresses a portion of the sensor 70. As shown in FIGS. 2, 4, and 5, the sensor protuberance 64 is rectangular in shape and extends away from a remaining portion of the pawl member 24 opposite the locking protuberance 62; however, it is understood that the sensor protuberance 64 may have any other shape that facilitates contact with the sensor 70.

The lock gear 26 is an annular member rotatably disposed within the transmission housing 10 which is drivingly engaged with an output shaft 72. The lock gear 26 comprises a plurality of inner splines 74 and a plurality of outer teeth 76.

The lock gear 26 is drivingly engaged with the output shaft 72 through the plurality of inner splines 74 formed on the lock gear 26 and a corresponding plurality of splines formed in an outer surface of the output shaft 72; however, it is understood that the lock gear 26 may be drivingly engaged with the output shaft 72 in any conventional manner or that the lock gear 26 and the output shaft 72 may be unitarily formed. The plurality of inner splines 74 are formed about a shaft perforation 78 defined by the lock gear 26, as shown on FIGS. 4 and 5.

The plurality of outer teeth 76 are arranged in a circular array on an outer edge 80 of the lock gear 26. Each of the outer teeth 76 is trapezoidal in shape and extends radially from a remaining portion of the lock gear 26. A plurality of locking recesses 82 are defined by the spaces between successive outer teeth 76. Each of the locking recesses 82 has a shape corresponding to at least a portion of the locking protuberance 62. When the locking protuberance 62 is placed in one of the locking recesses 82, the locking protuberance 62 prevents the lock gear 26 from rotating with the output shaft 72.

In use, the parking lock mechanism 12 may be placed in an engaged position or a disengaged position. When a vehicle (not shown) the parking lock mechanism 12 is incorporated in is placed in a drive condition, such as when the vehicle is moving or merely intermittently stopped, the parking lock mechanism 12 is placed in the disengaged position. When the vehicle the parking lock mechanism 12 is incorporated in is placed in a park condition, such as when the vehicle does not contain an operator or when the vehicle is placed in a non-moving state that requires no additional action by the operator to maintain the non-moving state, the parking lock mechanism 12 is placed in the engaged position. Additionally, it is understood that when the vehicle is transitioning from the disengaged position to the engaged position, the parking lock mechanism 12 being placed in the engaged position may be delayed until alignment between one of the locking recesses 82 and the locking protuberance 62 occurs.

FIG. 4 illustrates the parking lock mechanism 12 placed in the disengaged position. In the disengaged position, the pawl member 24 is rotated away from the lock gear 26 and the locking protuberance 62 is removed from one of the locking recesses 82. Such a position of the pawl member 24 allows the lock gear 26 and the output shaft 72 to rotate in response to driving engagement between the output shaft 72 and a drive shaft (not shown) or a drive gear (not shown) of the vehicle.

To place the parking lock mechanism 12 in the disengaged position, the motor 14 is activated by the operator of the vehicle or a control system (not shown) of the vehicle to rotate the actuation shaft 16 in a counter-clockwise direction. Because the release cam 20 is disposed on and drivingly engaged with the actuation shaft 16, the release cam 20 rotates in response to activation of the motor 14. The release member 50 of the release cam 20 then contacts and applies a force to the engagement end 60 of the pawl member 24. In response to the force applied by the release member 50 to the engagement end 60, the locking protuberance 62 is released from the locking recess 82 and the pawl member 24 rotates about the pivot perforation 58. It is understood that the application of force by the motor 14 may be necessary to free the locking protuberance 62 from within one of the locking recesses 82, as the locking protuberance 62 may abut one of the outer teeth 76 and necessitate an application of force greater than a force applied by the pawl biasing member 66. Rotation of the pawl member 24 about the pivot perforation 58 causes the locking protuberance 62 to be removed from one of the locking recesses 82 and the parking lock mechanism 12 is placed in the disengaged position.

FIG. 5 illustrates the parking lock mechanism 12 placed in the engaged position. In the engaged position, the pawl member 24 is drivingly engaged with the lock gear 26 and the locking protuberance 62 is disposed in one of the locking recesses 82. Such a position of the pawl member 24 militates against a rotation of the lock gear 26 and the output shaft 72 in response to driving engagement between the output shaft 72 and a drive shaft (not shown) or a drive gear (not shown) of the vehicle.

To place the parking lock mechanism 12 in the engaged position, the motor 14 is activated by the operator of the vehicle or the control system of the vehicle to rotate the actuation shaft 16 in a clockwise direction. Because the release cam 20 is disposed on and drivingly engaged with the actuation shaft 16, the release cam 20 rotates in response to activation of the motor 14. The engagement portion 52 of the release cam 20 then contacts and applies a force to the second end 54 of the cam biasing member 22. In response to the force applied to the second end 54 of the cam biasing member 22, the cam biasing member 22 rotates and the first end 46 of the cam biasing member 22 applies a force to the engagement portion 44 of the engagement cam 18. Because the engagement cam 18 is rotatably disposed on the actuation shaft 16, the engagement cam 18 is driven through the cam biasing member 22. Such an arrangement allows the cam biasing member 22 to store the energy necessary to rotate the pawl member 24 through the contact portion 42 of the engagement cam 18 when the operator of the vehicle or the control system of the vehicle attempts to place the parking lock mechanism 12 in the engaged position when the locking protuberance 62 is not aligned with one of the locking recesses 82.

When the locking protuberance 62 is not aligned with one of the locking recesses 82, the locking protuberance 62 contacts an outermost peripheral edge 84 of one of the outer teeth 76, which prevents the parking lock mechanism 12 from being placed in the engaged position. When this occurs, the engagement cam 18 stops rotating, and force applied to the cam biasing member 22 is stored in the cam biasing member 22 instead of driving the engagement cam 18 through the cam biasing member 22.

Upon rotation of the output shaft 72 (and thus the lock gear 26), the locking protuberance 62 becomes aligned with one of the locking recesses 82. Upon alignment, the engagement cam 18 drives the engagement end 60 of the pawl member 24 about the pivot perforation 58 towards the lock gear 26 using the energy stored in the cam biasing member 22. The locking protuberance 62 then enters one of the locking recesses 82 to place the parking lock mechanism 12 in the engaged position shown in FIG. 5.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:
1. A parking lock mechanism, comprising:
a motor, an actuation shaft, an engagement cam, a release cam, a cam biasing member, a pawl member and a lock gear;
said engagement cam comprises a first side, a second side and a perforation formed there through, an outer edge of said engagement cam comprises a contact portion and an engagement portion, said engagement portion extends radially outward from said engagement cam;

said release cam comprises a first side, a second side and a perforation formed there through, an outer edge of said release cam comprises a release member and an engagement portion, said release member is tapered and extends radially outward from said release cam;

said cam biasing member comprises a first end, a coil portion and a second end;

said release cam engagement portion engages a second end of said cam biasing member;

said pawl member comprises a pivot perforation, an engagement end, a locking protuberance, and sensor protuberance, said pawl member is disposed adjacent said engagement cam and said release cam;

said lock gear comprises a plurality of inner splines and plurality of outer teeth;

wherein said engagement cam and said release cam are independently moveable with respect to one another.

2. A parking lock mechanism according to claim 1, wherein said first side of said engagement cam is disposed against a step formed of said actuation shaft.

3. A parking lock mechanism according to claim 1, wherein said second side of said engagement cam is disposed against said release cam.

4. A parking lock mechanism according to claim 1, wherein said contact portion of said engagement cam has an increasing radius with respect to said perforation.

5. A parking lock mechanism according to claim 4, wherein an initial radius R1 of said contact portion of said engagement cam is substantially equal to a radius of a remaining portion of said engagement cam.

6. A parking lock mechanism according to claim 4, wherein a final radius R2 of said contact portion is greater than a radius of a remaining portion of said engagement cam.

7. A parking lock mechanism according to claim 1, wherein said first side of said release cam is disposed adjacent said second side of said engagement cam.

8. A parking lock mechanism according to claim 1, wherein said second side of said release cam is disposed against said cam biasing member.

9. A parking lock mechanism according to claim 1, wherein said first end and said second end of said cam biasing member are both bent into a right angle.

10. A parking lock mechanism according to claim 1, wherein said plurality of outer teeth of said lock gear are arranged in a circular array on an outer edge of said lock gear, said teeth are trapezoidal in shape and each extends radially from a remaining portion of said lock gear, a plurality of locking recesses are defined by the spaces between said teeth.

11. A parking lock mechanism according to claim 1, wherein said pawl member pivots in a plane substantially parallel to a plane each of said engagement cam and said release cam are able to rotate within.

12. The parking lock mechanism according to claim 1, wherein said cam biasing member is coaxial with said actuation shaft.

13. The parking lock mechanism according to claim 1, wherein said engagement cam and said release cam are axially offset from one another on said actuation shaft.

* * * * *